United States Patent
DiSalvo

(10) Patent No.: US 7,209,330 B2
(45) Date of Patent: Apr. 24, 2007

(54) RESET LOCKOUT FOR CIRCUIT INTERRUPTING DEVICE

(75) Inventor: Nicholas L. DiSalvo, Levittown, NY (US)

(73) Assignee: Leviton Manufacturing Co., Inc., Little Neck, NY (US)

( * ) Notice: Subject to any disclaimer, the term of this patent is extended or adjusted under 35 U.S.C. 154(b) by 25 days.

(21) Appl. No.: 11/301,971

(22) Filed: Dec. 12, 2005

(65) Prior Publication Data

US 2006/0092586 A1    May 4, 2006

Related U.S. Application Data

(63) Continuation of application No. 10/724,973, filed on Dec. 1, 2003, now Pat. No. 6,975,492, which is a continuation of application No. 10/090,662, filed on Mar. 4, 2002, now Pat. No. 6,657,835, which is a continuation of application No. 09/531,990, filed on Mar. 20, 2000, now Pat. No. 6,381,112, which is a continuation of application No. 09/138,955, filed on Aug. 24, 1998, now Pat. No. 6,040,967.

(51) Int. Cl.
   *H02H 3/00* (2006.01)

(52) U.S. Cl. .................................... 361/42

(58) Field of Classification Search ............. 335/18, 335/21, 24, 26, 202; 361/42–50
See application file for complete search history.

(56) References Cited

U.S. PATENT DOCUMENTS

| | | | | |
|---|---|---|---|---|
| 3,309,571 A | * | 3/1967 | Gilker | 361/73 |
| 3,538,477 A | * | 11/1970 | Boysen et al. | 337/74 |
| 3,702,418 A | * | 11/1972 | Obenhaus | 361/59 |
| 3,731,154 A | * | 5/1973 | Torosian | 361/130 |
| 3,864,649 A | * | 2/1975 | Doyle | 335/21 |
| 3,872,354 A | * | 3/1975 | Nestor et al. | 361/45 |
| 3,949,336 A | * | 4/1976 | Dietz | 335/166 |
| 4,002,951 A | * | 1/1977 | Halbeck | 361/45 |
| 4,034,266 A | * | 7/1977 | Virani et al. | 361/42 |
| 4,034,360 A | * | 7/1977 | Schweitzer, Jr. | 340/502 |
| 4,063,299 A | * | 12/1977 | Munroe | 361/45 |
| 4,086,549 A | * | 4/1978 | Slater et al. | 335/18 |
| 4,223,365 A | * | 9/1980 | Moran | 361/71 |
| 4,237,435 A | * | 12/1980 | Cooper et al. | 335/166 |
| 4,316,230 A | * | 2/1982 | Hansen et al. | 361/114 |
| 4,521,824 A | * | 6/1985 | Morris et al. | 361/45 |
| 4,567,456 A | * | 1/1986 | Legatti | 335/20 |
| 4,574,260 A | * | 3/1986 | Franks | 335/20 |
| 4,578,732 A | * | 3/1986 | Draper et al. | 361/45 |
| 4,587,588 A | * | 5/1986 | Goldstein | 361/54 |
| 4,595,894 A | * | 6/1986 | Doyle et al. | 335/18 |
| 4,630,015 A | | 12/1986 | Gernhardt et al. | |
| 4,631,624 A | * | 12/1986 | Dvorak et al. | 361/89 |
| 4,719,437 A | * | 1/1988 | Yun | 335/18 |
| 4,802,052 A | * | 1/1989 | Brant et al. | 361/42 |
| 4,851,951 A | * | 7/1989 | Foster, Jr. | 361/50 |
| 4,901,183 A | * | 2/1990 | Lee | 361/56 |

(Continued)

FOREIGN PATENT DOCUMENTS

AU           759587           7/2003

(Continued)

*Primary Examiner*—Ramon M. Barrera
(74) *Attorney, Agent, or Firm*—Paul J. Sutton

(57) ABSTRACT

Resettable circuit interrupting devices, such as GFCI devices, that include a reset lock-out mechanism are provided. The reset lock-out mechanism prevents the resetting of electrical connections between input and output conductors if the circuit interrupting mechanism used to break the connection is non-operational or if an open neutral condition exists.

1 Claim, 8 Drawing Sheets

U.S. PATENT DOCUMENTS

| | | | |
|---|---|---|---|
| 4,967,308 A * | 10/1990 | Morse | 361/42 |
| 4,979,070 A * | 12/1990 | Bodkin | 361/42 |
| 5,148,344 A * | 9/1992 | Rao et al. | 361/42 |
| 5,185,687 A | 2/1993 | Beihoff et al. | |
| 5,202,662 A * | 4/1993 | Bienwald et al. | 335/18 |
| 5,223,810 A * | 6/1993 | Van Haaren | 335/18 |
| 5,224,006 A * | 6/1993 | MacKenzie et al. | 361/45 |
| 5,229,730 A * | 7/1993 | Legatti et al. | 335/18 |
| 5,347,248 A * | 9/1994 | Herbert | 335/18 |
| 5,418,678 A * | 5/1995 | McDonald | 361/46 |
| 5,448,443 A * | 9/1995 | Muelleman | 361/111 |
| 5,477,412 A * | 12/1995 | Neiger et al. | 361/45 |
| 5,517,165 A * | 5/1996 | Cook | 335/18 |
| 5,541,800 A * | 7/1996 | Misencik | 361/45 |
| 5,555,150 A * | 9/1996 | Newman, Jr. | 361/56 |
| 5,594,398 A * | 1/1997 | Marcou et al. | 335/18 |
| 5,600,524 A * | 2/1997 | Neiger et al. | 361/42 |
| 5,617,284 A * | 4/1997 | Paradise | 361/58 |
| 5,625,285 A * | 4/1997 | Virgilio | 324/133 |
| 5,637,000 A * | 6/1997 | Osterbrock et al. | 439/107 |
| 5,655,648 A * | 8/1997 | Rosen et al. | 200/401 |
| 5,661,623 A * | 8/1997 | McDonald et al. | 361/42 |
| 5,694,280 A * | 12/1997 | Zhou | 361/45 |
| 5,706,155 A * | 1/1998 | Neiger et al. | 361/45 |
| 5,729,417 A * | 3/1998 | Neiger et al. | 361/45 |
| 5,805,397 A * | 9/1998 | MacKenzie | 361/42 |
| 5,815,363 A * | 9/1998 | Chu | 361/154 |
| 5,825,602 A * | 10/1998 | Tosaka et al. | 361/94 |
| 5,844,765 A * | 12/1998 | Kato et al. | 361/115 |
| 5,847,913 A * | 12/1998 | Turner et al. | 361/93.1 |
| 5,875,087 A * | 2/1999 | Spencer et al. | 361/87 |
| 5,933,063 A * | 8/1999 | Keung et al. | 335/18 |
| 5,943,198 A * | 8/1999 | Hirsh et al. | 361/42 |
| 5,956,218 A * | 9/1999 | Berthold | 361/42 |
| 5,963,408 A * | 10/1999 | Neiger et al. | 361/45 |
| 6,040,967 A * | 3/2000 | DiSalvo | 361/42 |
| 6,052,265 A * | 4/2000 | Zaretsky et al. | 361/42 |
| 6,226,161 B1 * | 5/2001 | Neiger et al. | 361/45 |
| 6,246,558 B1 * | 6/2001 | DiSalvo et al. | 361/42 |
| 6,252,407 B1 * | 6/2001 | Gershen | 324/509 |
| 6,282,070 B1 * | 8/2001 | Ziegler et al. | 361/42 |
| 6,288,882 B1 * | 9/2001 | DiSalvo et al. | 361/42 |
| 6,309,248 B1 * | 10/2001 | King | 439/535 |
| 6,324,043 B1 * | 11/2001 | Turner | 361/104 |
| 6,381,112 B1 * | 4/2002 | DiSalvo | 361/42 |
| 6,437,700 B1 * | 8/2002 | Herzfeld et al. | 340/650 |
| 6,437,953 B2 * | 8/2002 | DiSalvo et al. | 361/42 |
| D462,660 S * | 9/2002 | Huang et al. | D13/139.3 |
| 6,580,344 B2 * | 6/2003 | Li | 335/18 |
| 6,590,753 B1 * | 7/2003 | Finlay | 361/42 |
| 6,621,388 B1 * | 9/2003 | Macbeth | 335/18 |
| 6,646,838 B2 * | 11/2003 | Ziegler et al. | 361/42 |
| 6,657,834 B2 * | 12/2003 | DiSalvo | 361/42 |
| 6,671,145 B2 * | 12/2003 | Germain et al. | 361/45 |
| 6,693,779 B2 * | 2/2004 | DiSalvo | 361/42 |
| 6,717,782 B2 * | 4/2004 | DiSalvo et al. | 361/42 |
| 6,771,152 B2 * | 8/2004 | Germain et al. | 335/18 |
| 6,864,766 B2 | 3/2005 | DiSalvo et al. | |
| 6,864,769 B2 | 3/2005 | Germain et al. | |
| 6,975,492 B2 * | 12/2005 | DiSalvo | 361/42 |
| 2003/0085783 A1 | 5/2003 | Macbeth | |
| 2003/0151478 A1 * | 8/2003 | Radosavljevic et al. | 335/18 |

FOREIGN PATENT DOCUMENTS

| | | |
|---|---|---|
| EP | 0 526 071 A | 2/1993 |
| GB | 830018 | 3/1960 |
| GB | 2207823 | 2/1989 |
| GB | 2290181 | 12/1995 |
| WO | WO 96/01484 | 1/1996 |
| WO | PCT/US99/19319 | 3/2000 |
| WO | PCT/US00/22955 | 3/2001 |
| WO | PCT/US01/32562 | 4/2004 |
| WO | WO 2004/070751 | 8/2004 |
| WO | WO 2004/070752 | 8/2004 |

* cited by examiner

RESET LOCKOUT FOR CIRCUIT INTERRUPTING DEVICE

This application is a continuation of application Ser. No. 10/724,973 filed Dec. 1, 2003, now U.S. Pat. No. 6,975,492, which is a continuation of application Ser. No. 10/090,662, filed on Mar. 4, 2002, now U.S. Pat. No. 6,657,834, which is a continuation of application Ser. No. 09/531,990, filed on Mar. 20, 2000, now U.S. Pat. No. 6,381,112, which is a continuation of application Ser. No. 09/138,955, filed on Aug. 24, 1998, now U.S. Pat. No. 6,040,967.

BACKGROUND

1. Field

The present application is directed to the family of resettable circuit interrupting devices and systems which include, without limitation, ground fault circuit interrupters (GFCI's), arc fault circuit interrupters (AFCI's), immersion detection circuit interrupters (IDCI's), appliance leakage circuit interrupters (ALCI's), circuit breakers, contactors, latching relays and solenoid mechanisms. More particularly, the present application is directed to a reset system in such devices and systems which is capable of being "locked out" such that it cannot be reset by a user if a portion of a circuit interrupting mechanism becomes non-operational or if an open neutral condition exists.

2. Description of the Related Art

The electrical wiring device industry has witnessed an increasing call for circuit breaking devices or systems which are designed to interrupt power to various loads, such as household appliances, consumer electrical products and branch circuits. In particular, electrical codes require electrical circuits in home bathrooms and kitchens to be equipped with ground fault circuit interrupters, for example. Presently available GFCI devices, such as the device described in commonly owned U.S. Pat. No. 4,595,894, use a trip mechanism to mechanically break an electrical connection between one or more input and output conductors. Such devices are resettable after they are tripped by, for example, the detection of a ground fault. In the device discussed in the '894 patent, the trip mechanism used to cause the mechanical breaking of the circuit (i.e., the connection between input and output conductors) includes a solenoid (or trip coil). A test button is used to test the trip mechanism and circuitry used to sense faults and a reset button is used to reset the electrical connection between input and output conductors.

However, instances may arise where an abnormal condition, caused by for example a lightening strike, occurs which may result not only in a surge of electricity at the device and a tripping of the device but also a disabling of the trip mechanism used to cause the mechanical breaking of the circuit. This may occur without the knowledge of the user. Under such circumstances an unknowing user, faced with a GFCI which has tripped, may press the reset button which, in turn, will cause the device with an inoperative trip mechanism to be reset without the ground fault protection available.

Further, an open neutral condition, which is defined in Underwriters Laboratories (UL) Standard PAG 943A, may exist with the electrical wires supplying electrical power to such GFCI devices. If an open neutral condition exists with the neutral wire on the line (verses load) side of the GFCI device, an instance may arise where a current path is created from the phase (or hot) wire supplying power to the GFCI device through the load side of the device and a person to ground. In the event that an open neutral condition exists, current GFCI devices which have tripped, may be reset even though the open neutral condition may remain.

SUMMARY

The present application relates to resettable circuit interrupting devices, such as but not limited to GFCI devices, that include a reset lock-out mechanism which prevents the resetting of electrical connections (or continuity) between input and output conductors if the circuit interrupter used to break the connection is non-operational or if an open neutral condition exists.

The circuit interrupter includes a trip mechanism used to cause the mechanical or electrical breaking of continuity between the input and output conductive paths or conductors and the sensing circuitry used to sense faults.

In one embodiment, the circuit interrupting device includes a housing, an input conductive path and an output conductive path. Preferably, the input conductive path is disposed at least partially within the housing and is capable of being electrically connected to a source of electricity. Preferably, the output conductive path is also disposed at least partially within the housing and is capable of conducting electrical current to a load when electrical continuity is established with the input conductive path. Electrical continuity between the conductive paths may be established using electromechanical mechanisms, such as movable electrical contacts and solenoids, or using semiconductor type switching devices. The device also includes a circuit interrupter disposed within the housing and configured to break electrical continuity between the input and output conductive paths in response to the occurrence of a predetermined condition. Predefined conditions include, without limitation, ground faults, arc faults, appliance leakage faults, immersion faults and a test cycle.

In response to the occurrence of the predefined condition, a reset lock-out operable in a lock-out position or state and in a reset position or state is set to one of the states. In the lock-out position or state, the reset lock-out inhibits resetting of electrical continuity between the input and output conductive paths, and in the reset position or state, the reset lock-out does not inhibit resetting of electrical continuity between the input and output conductive paths. The circuit interrupting device also includes a reset mechanism operatively associated with the reset lock-out and the circuit interrupter. Activation of the reset mechanism activates the circuit interrupter which facilitates changing the operable position or state of the reset lock-out from the lock-out position or state to the reset position or state.

In another embodiment, the circuit interrupting device includes a housing, an input conductor disposed at least partially within the housing and capable of being electrically connected to a source of electricity, and an output conductor disposed at least partially within the housing and capable of conducting electrical current to a load when electrically connected to the input conductor. In this embodiment, electrical connections between the conductors may be established using electromechanical mechanisms or semiconductor type switching devices.

The device also includes a circuit interrupter that is disposed within the housing and configured to break the electrical connection between the input and output conductors in response to the occurrence of a predetermined condition. Again, predefined conditions include, without limitation, ground faults, arc faults, appliance leakage faults, immersion faults and a test cycle. In response to the occurrence of the predefined condition, a reset lock-out operable between a lock-out position (or state) and a reset position (or state) is set to one of the positions. In the lock-out position, the reset lock-out inhibits resetting of the electrical connection between the input and output conductors, and in the reset position, the reset lock-out does not inhibit resetting of the electrical connection between the input and output conductors. The circuit interrupting device also includes a reset mechanism operatively associated with the reset lock-out and the circuit interrupter. Activation of the reset mechanism activates the circuit interrupter which facilitates changing the operable position of the reset lock-out from the lock-out position to the reset position.

The circuit interrupter includes a trip mechanism and fault sensing circuitry. The trip mechanism may be an electromechanical mechanism (e.g., a solenoid or relay), a solid state mechanism or other mechanisms that may be used to break electrical continuity. A preferred electro-mechanical trip mechanism includes a coil assembly, a movable plunger and a banger. The movable plunger is responsive to energizing of the coil assembly, and the banger, which is attached to the plunger, moves when the plunger moves. Movement of the banger permits the reset lock-out to change operable positions.

Preferably, the reset mechanism includes a reset button that is coupled to the reset lock-out, and reset contacts that are activated when the reset button is depressed. When the reset button is depressed, the reset contacts close a circuit that, in the embodiment shown, activates the test cycle causing the circuit interrupter to activate permitting the reset lock-out to change operable positions.

This arrangement prevents the circuit interrupting device from being reset if the circuit interrupter is inoperative, since the circuit interrupter has to be activated in order to reset electrical continuity between the input and output conductive paths or conductors. In other words, this arrangement ensures that once the circuit interrupting device has been reset, it has the ability to again break electrical continuity between the input and output conductive paths because the sensing circuitry and trip mechanism of the circuit interrupter are utilized for resetting the continuity.

This arrangement also ensures that when such circuit interrupting devices are initially installed and energized the proper electrical connections have been made. For example, if the circuit interrupting device is a GFCI receptacle, improper electrical connections between input and output conductors on the receptacle and the line (hot) and load wires in a household junction box may cause a fault that is sensed by the circuit interrupter causing its trip mechanism to activate.

In addition, in the embodiments where the trip mechanism of the circuit interrupter uses power supplied to the device in order to activate, the arrangement of tying the resetting of the device with the operation of the circuit interrupter also prevents the circuit interrupting device from being reset if an open neutral condition exists with the wiring supplying electrical power to the device, since the circuit interrupter has to be activated in order to reset electrical continuity between the input and output conductive paths or conductors.

The present application also relates to a method for interrupting and resetting electrical connections in fault interrupting devices, such as the device above. The method involves sensing the occurrence of a predefined condition and breaking electrical continuity between input and output conductive paths or conductors when the predetermined condition is sensed. Preferably, a circuit interrupter having the above-described coil assembly, plunger and banger, is used to break continuity between the conductive paths.

After electrical continuity between the input and output conductive paths is broken, a lock-out mechanism is enabled so as to inhibit reestablishing electrical continuity between the input and output conductive paths. To reset the device, a reset mechanism is activated causing the circuit interrupter to operate and thus disable the lock-out mechanism and electrical continuity between the input and output conductive paths to be reestablished.

BRIEF DESCRIPTION OF THE DRAWINGS

Preferred embodiments of the present application are described herein with reference to the drawings in which similar elements are given similar reference characters, wherein.

DETAILED DESCRIPTION

Figure 1:
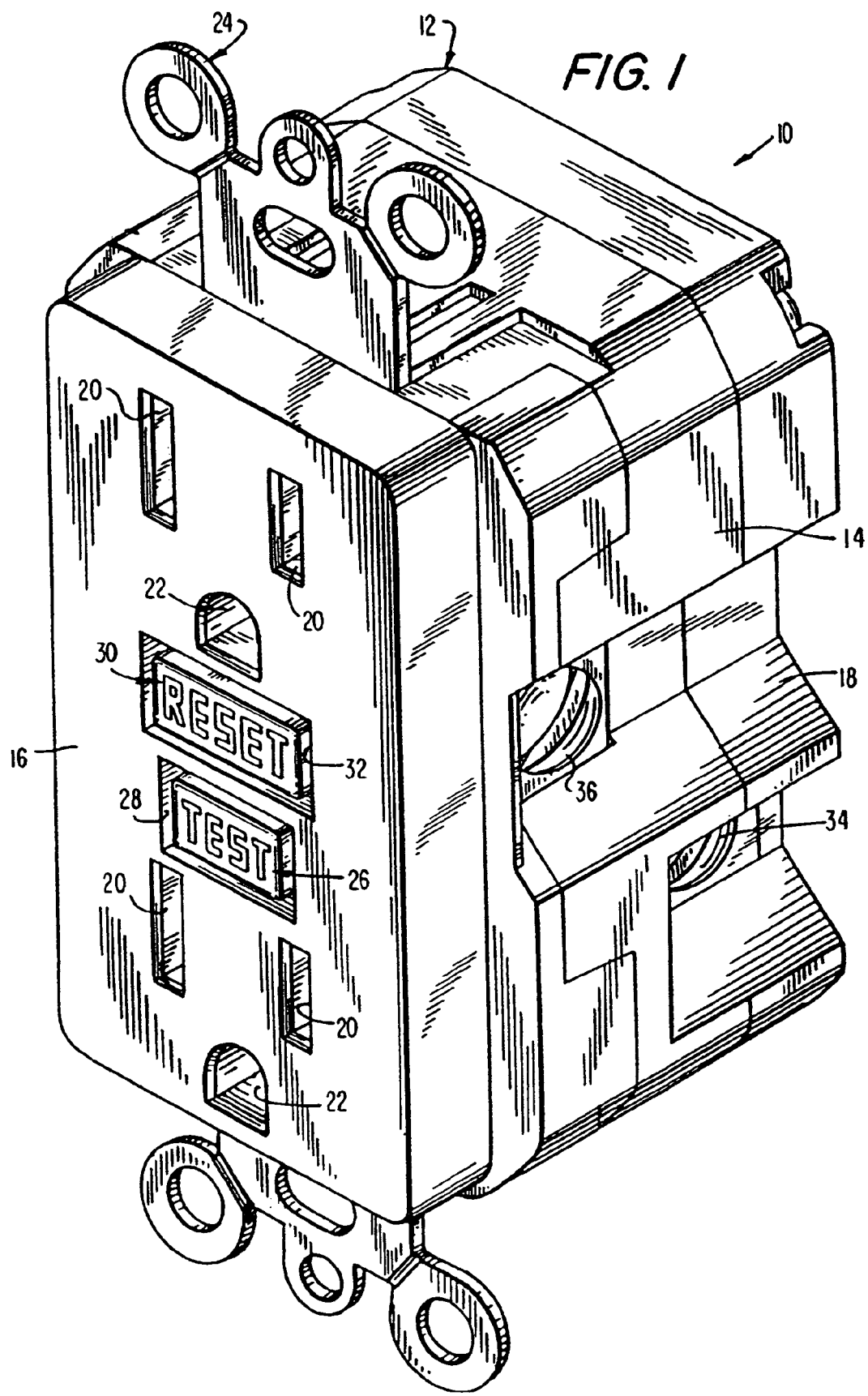
FIG. 1 is a perspective view of a ground fault circuit interrupting device according to the present application.

The present application provides a reset lock-out mechanism for resettable circuit interrupting devices, such as GFCI devices, that relates the resetting of electrical connections between input and output conductive paths or conductors to the operation of a circuit interrupter or circuit interrupting mechanism.

For the purposes of the present application, the reset lock-out mechanism according to the present application shown in the drawings and described hereinbelow is incorporated in a GFCI receptacle suitable for installation in a single-gang junction box in a home. However, the reset lock-out mechanism according to the present application can be included in any of the various devices in the family of resettable circuit interrupting devices, including ground fault circuit interrupters (GFCI's), arc fault circuit interrupters (AFCI's), immersion detection circuit interrupters (IDCI's), appliance leakage circuit interrupters (ALCI's).

Turning now to FIG. 1, the GFCI receptacle 10 has a housing 12 consisting of a relatively central body 14 to which a face or cover portion 16 and a rear portion 18 are removably secured. The face portion 16 has entry ports 20 for receiving normal or polarized prongs of a male plug of the type normally found at the end of a lamp or appliance cord set (not shown), as well as ground-prong-receiving openings 22 to accommodate a three-wire plug. The receptacle also includes a mounting strap 24 used to fasten the receptacle to a junction box.

A test button 26 extends through opening 28 in the face portion 16 of the housing 12. The test button is used to activate a test cycle, which test the operation of a circuit interrupter (or circuit interrupting mechanism) disposed in the device. The circuit interrupter, to be described in more detail below, is used to break electrical continuity between input and output conductive paths (or conductors). A reset button 30 forming a part of a reset mechanism extends through opening 32 in the face portion 16 of the housing 12. The reset button is used to activate a reset cycle, which reestablishes electrical continuity between the input and output conductive paths or conductors.

Electrical connections to existing household electrical wiring are made via binding screws 34 and 36, where screw 34 is an input (or line) connection point and screw 36 is an output (or load) connection point. It should be noted that two additional binding screws (not shown) are located on the opposite side of the receptacle 10. Similar to binding screws 34 and 36, these additional binding screws provide input and output connection points. Further, the input connections are for line side phase (hot) and neutral conductors of the household wiring, and the output connections are for load side phase (hot) and neutral conductors of the household wiring. The plug connections are also considered output conductors. A more detailed description of a GFCI receptacle is provided in U.S. Pat. No. 4,595,894 which is incorporated herein in its entirety by reference.

Figure 2:
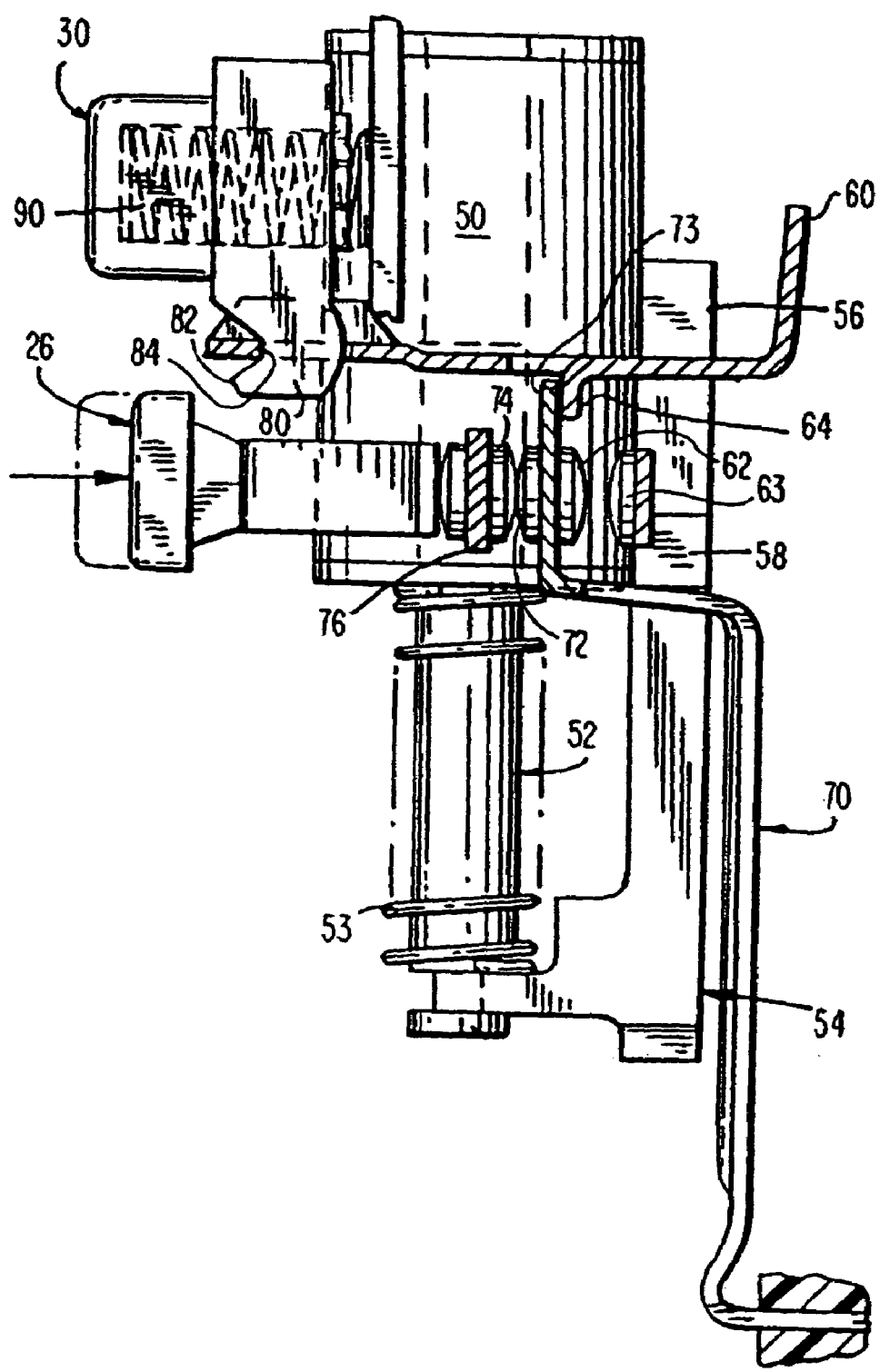
FIG. 2 is side elevational view, partly in section, of a reset mechanism for the GFCI device shown in FIG. 1, illustrating components of the reset mechanism and the GFCI device in a set or circuit making position.

Referring now to FIG. 2 there is shown mechanical components of trip and reset mechanism according to one embodiment of the present application. Although the trip and reset mechanisms shown in the drawings are electro-mechanical in nature, the present application also contemplates using semiconductor type trip and reset mechanisms, as well as other mechanisms capable or making and breaking electrical continuity.

Figure 8:
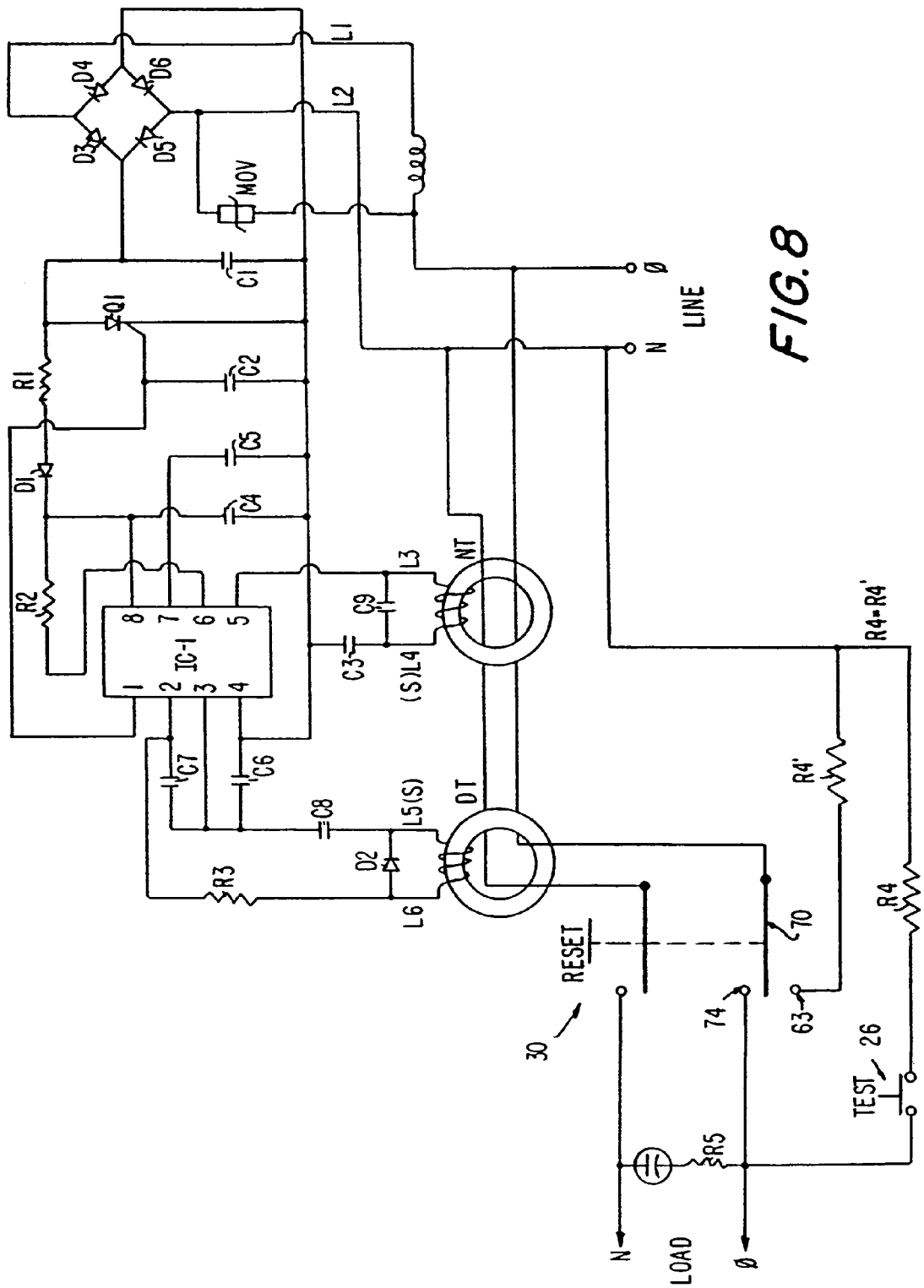
FIG. 8 is a schematic diagram of a circuit for detecting ground faults and resetting the GFCI device of FIG. 1.

The trip mechanism includes a coil assembly 50, a plunger 52 responsive to the energizing and de-energizing of the coil assembly and a banger 54 connected to the plunger 52. The banger 54 has a pair of banger dogs 56 and 58 which are used to set and reset the connection between input and output conductors. The trip mechanism is activated in response to the sensing of a ground fault by, for example, the electronic circuitry shown in FIG. 8. FIG. 8 includes a conventional circuitry for detecting ground faults that includes a differential transformer that senses current inbalances. As noted, the trip mechanism and fault sensing circuitry are included in the circuit interrupter.

The reset mechanism includes reset button 30, movable latching member 60 connected to the reset button 30 and reset contacts 62 and 63 that temporarily activate the trip mechanism when the reset button is depressed. Preferably, the reset contacts 62 and 63 are normally open momentary contacts.

Figure 3:
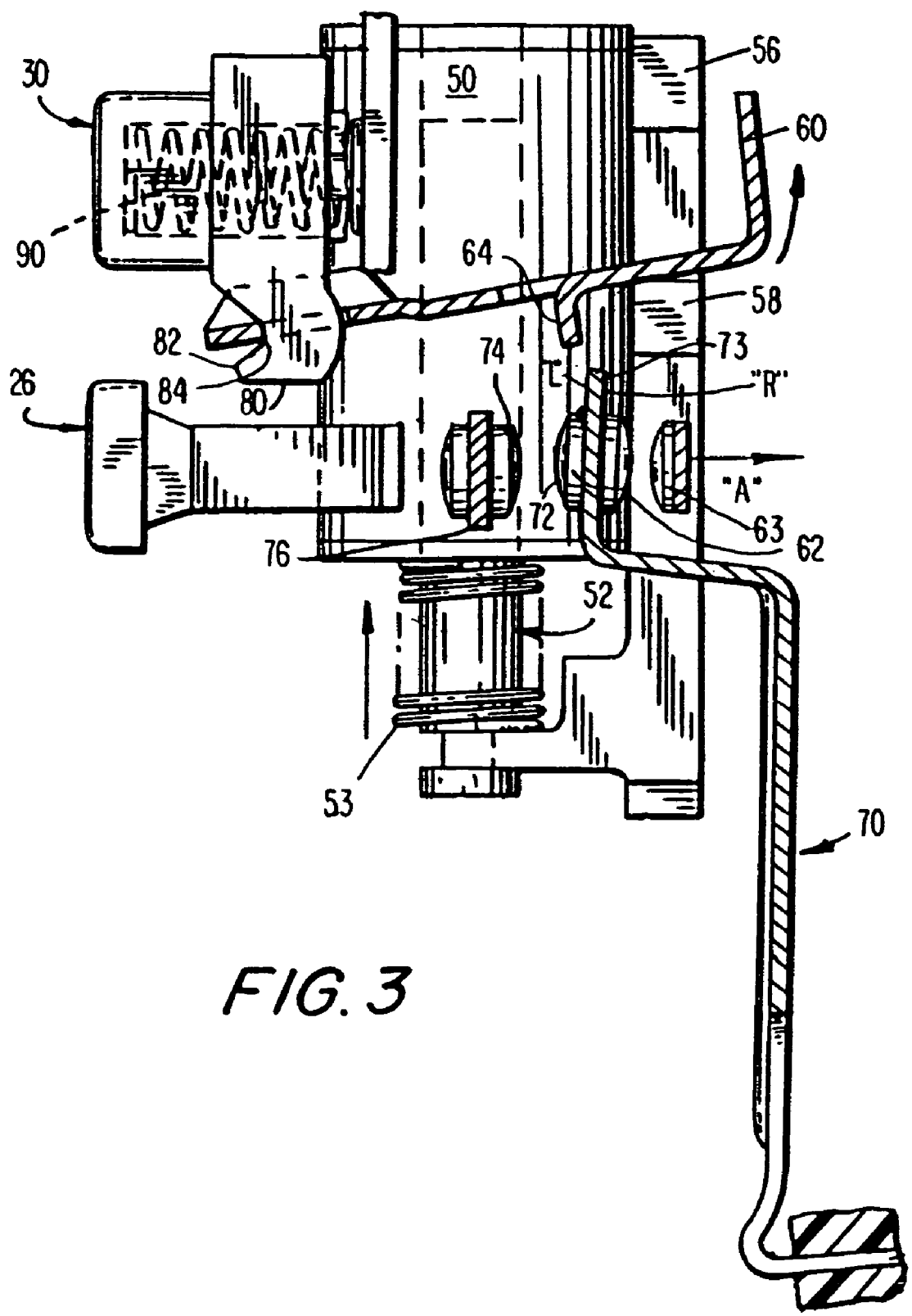
FIG. 3 is a side elevational view similar to FIG. 2, illustrating components of the reset mechanism for the GFCI device in a circuit breaking or interrupting position.
Figure 4:
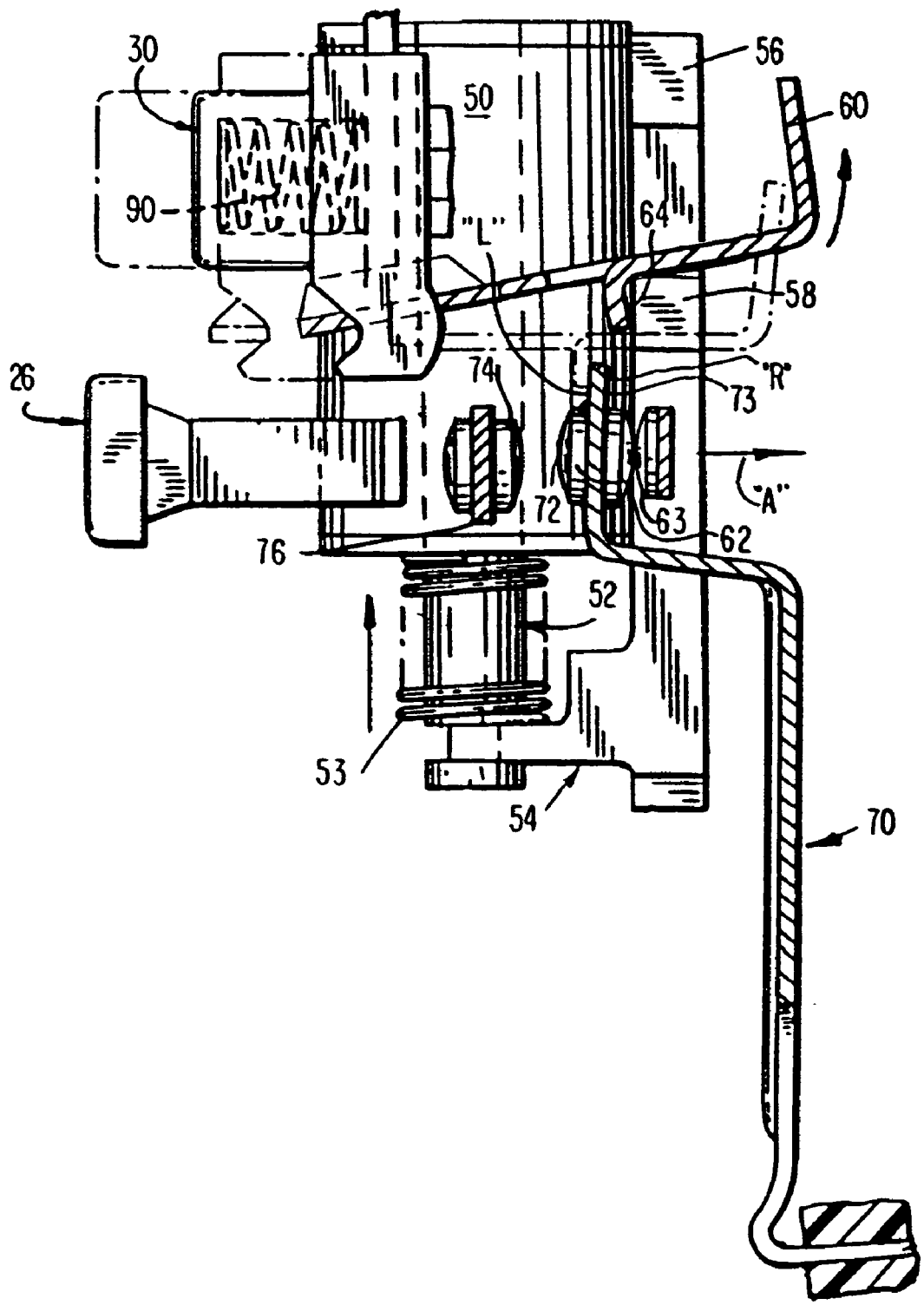
FIG. 4 is a side elevational view similar to FIG. 2, illustrating the components of the reset mechanism after a reset button has been depressed.

FIGS. 2–4 show the mechanical components of the trip and reset mechanisms in various stages of operation. In FIG. 2, the GFCI receptacle is shown in a set position where movable contact arm 70 is in a stressed condition so that movable contact 72 is in electrical engagement with fixed contact 74 of contact arm 76. Referring to FIG. 3, if the sensing circuitry of the GFCI receptacle senses a ground fault or if the test button 26 is depressed, the coil assembly 50 is energized to draw plunger 52 into the coil assembly 50 so that banger 54 moves upwardly. As the banger moves upwardly, the banger front dog 58 strikes the latch member 60 causing it to pivot in a counterclockwise direction about the joint created by the top edge 82 and inner surface 84 of finger 80. The movement of the latch member 60 removes the latching finger 64 from engagement with side R of the remote end 73 of the movable contact arm 70, and permits contact arm 70 to return to its pre-stressed condition opening contacts 72 and 74. It should be noted that the description thus far has been in terms of a single latch member 60 and a single contact arm 70. However, there are preferably two sets of latch members 60 and contact arms 70: one set for the input conductors; and the other set for the output conductors. Further, the banger 54 preferably has two sets of banger dogs: one set for the phase (or hot) conductors; and the other set for the neutral conductors.

Figure 6:
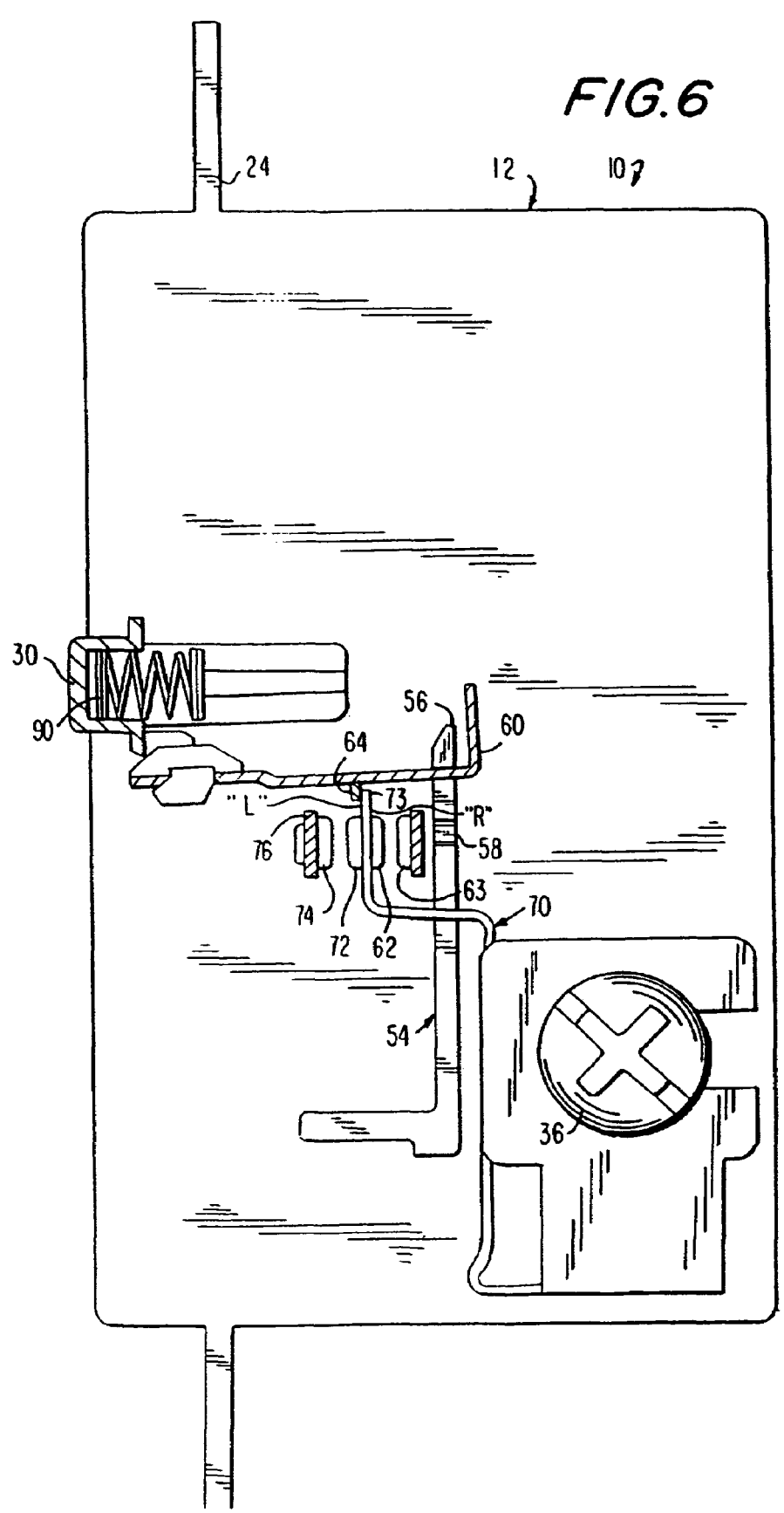

After tripping, the coil assembly 50 is de-energized so that spring 53 returns plunger 52 to its original extended position and banger 54 moves to its original position releasing latch member 60. At this time the latch member 60 is in a lock-out position where latch finger 64 inhibits movable contact 72 from engaging fixed contact 74, as seen in FIG. 6.

Figure 7:
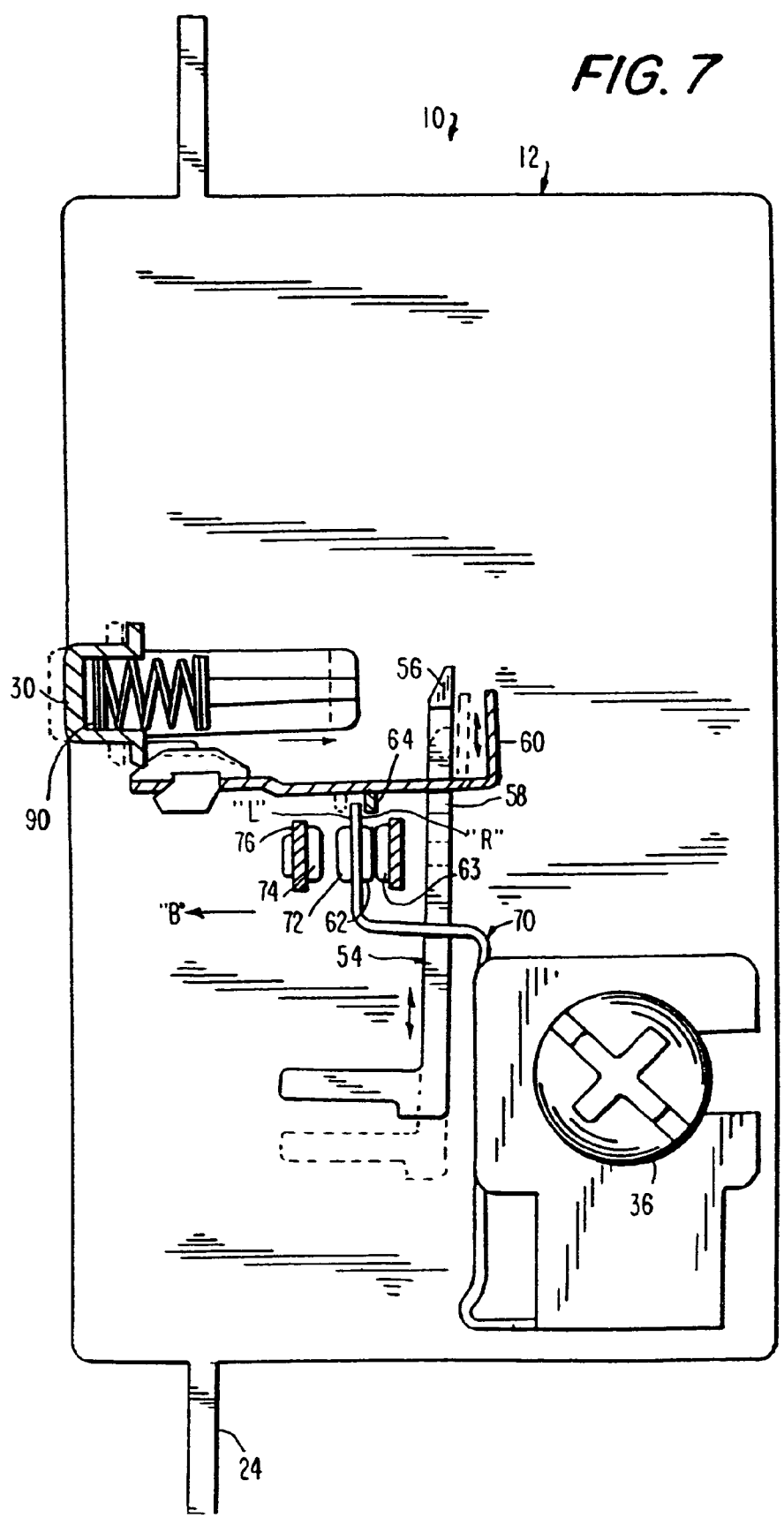

To reset the GFCI receptacle so that contacts 72 and 74 are closed and continuity between the input and output conductors is reestablished, the reset button 30 is depressed sufficiently to overcome the bias force of return spring 90 and move the latch member 60 in the direction of arrow A, seen in FIG. 4. While the reset button 30 is being depressed, latch finger 64 contacts side L of the movable contact arm 70 and continued depression of the reset button 30 forces the latch member to overcome the stress force exerted by the arm 70 causing the reset contact 62 on the arm 70 to close on reset contact 63. Closing the reset contacts completes a test circuit so that the test cycle is activated. As described above, during the test cycle the plunger 52 moves the banger 54 upwardly so that the banger 54 strikes the latch member 60 pivoting the latch finger 64 while the latch member 60 continues to move in the direction of arrow A. As a result, the latch finger 64 is lifted over side L of the remote end 73 of the movable contact arm 70 onto side R of the remote end of the movable contact arm, as seen in FIG. 7.

Figure 5:
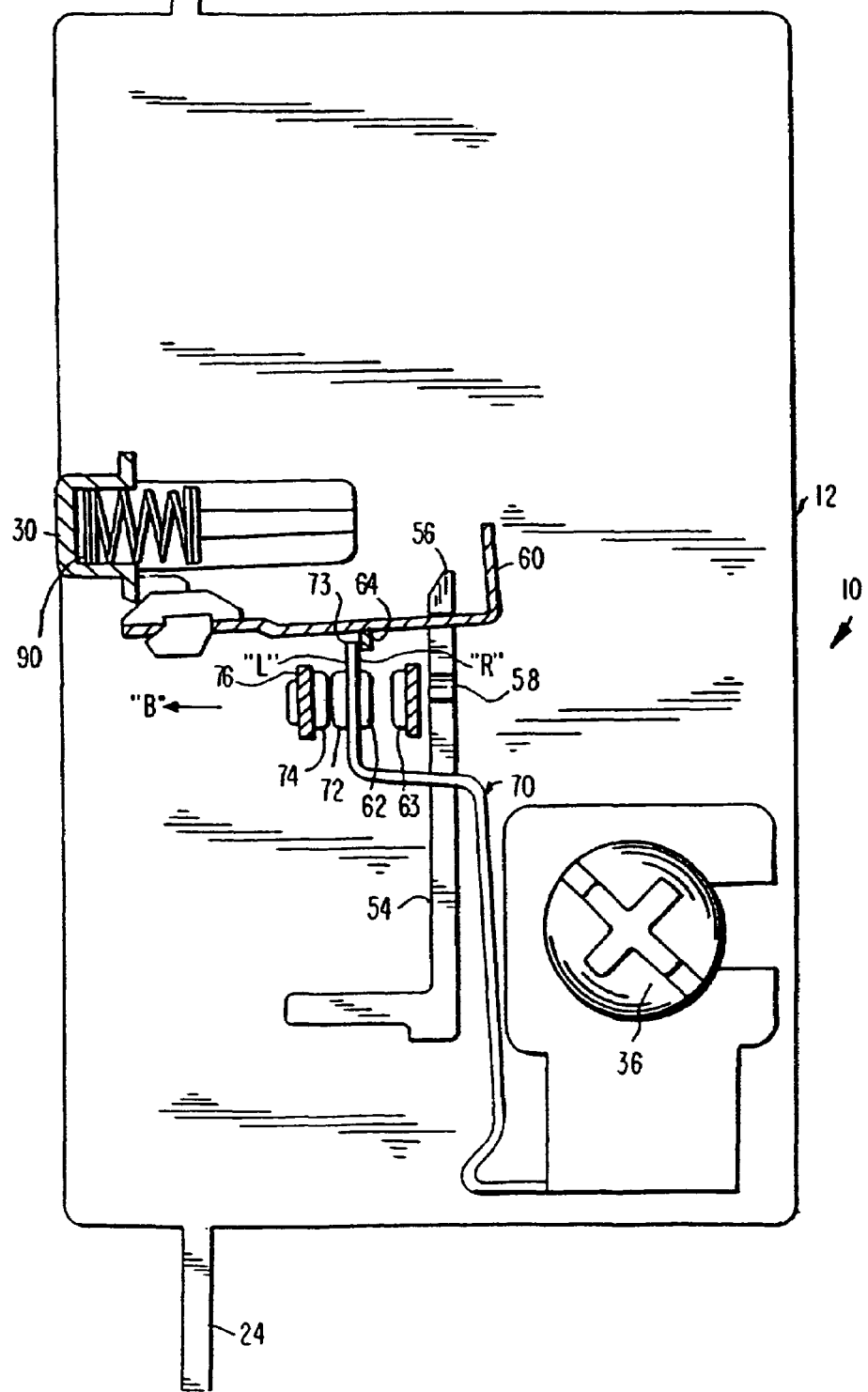
FIGS. 5–7 are schematic representations of one embodiment of the reset mechanism of the present application, illustrating a latching member used to make an electrical connection between input and output conductors and to relate the reset mechanism of the electrical connection with the operation of the trip mechanism.

After tripping, the coil assembly 50 is de-energized so that so that plunger 52 returns to its original extended position, and banger 54 releases the latch member 60 so that the latch finger 64 is in a reset position, seen in FIG. 5. Release of the reset button causes the latching member 60 and movable contact arm 70 to move in the direction of arrow B until contact 72 electrically engages contact 74.

Using the reset lock-out feature described above permits the resetting of the GFCI device or any of the other devices in the family of circuit interrupting devices only if the circuit interrupter (or circuit interrupting mechanism) is operational.

While there have been shown and described and pointed out the fundamental features of the invention as applied to the preferred embodiment, as is presently contemplated for carrying them out, it will be understood that various omissions and substitutions and changes of the form and details of the device described and illustrated and in its operation may be made by those skilled in the art, without departing from the spirit of the invention.

What is claimed is:

1. A circuit interrupting device comprising:
   a housing;
   a first electrical conductive path disposed at least partially within said housing and capable of being electrically connected to a source of electricity;
   a second electrical conductive path disposed at least partially within said housing and capable of conducting electrical current to a load when electrically continuity between said first and second electrical conductive paths is made;

a circuit interrupter disposed within said housing and configured to break the continuity between said first and second conductive paths upon the occurrence of a predetermined condition;

a test button disposed partially within said housing adapted to use power supplied to said device to simulate, when depressed, the occurrence of a predetermined condition to cause said circuit interrupter to operate and break continuity between said first and second conductive paths;

a reset mechanism including a reset button disposed partially within said housing, said reset mechanism configured to make electrical continuity between the first and second conductive paths after said predetermined condition occurs;

a reset lock-out coupled to said reset mechanism that prevents the making of electrical continuity between said first and second conductive paths if said circuit interrupter is non-operational; and reset contacts coupled to be activated when said reset button is depressed to close a circuit that simulates the occurrence of said predetermined condition to prevent the device being reset if an open neutral condition exists when said device is connected to the source of electricity.

* * * * *

UNITED STATES PATENT AND TRADEMARK OFFICE
CERTIFICATE OF CORRECTION

PATENT NO. : 7,209,330 B2  
APPLICATION NO. : 11/301971  
DATED : April 24, 2007  
INVENTOR(S) : Nicholas L. DiSalvo Page 1 of 1

It is certified that error appears in the above-identified patent and that said Letters Patent is hereby corrected as shown below:

On the title page  
Related U.S. Application Data (63)

"Continuation of application No. 10/724,973 filed Dec. 1, 2003, now Pat. No. 6,975,492, which is a continuation of application No. 10/090,662, filed on Mar. 4, 2002, now Pat. No. 6,657,835, which is a continuation of application No. 09/531,990, filed on Mar. 20, 2000, now Pat. No. 6,381,112, which is a continuation of application No. 09/138,955, filed on Aug. 24, 1998, now Pat. No. 6,040,967."

should read

--Continuation of application No. 10/724,973 filed Dec. 1, 2003, now Pat. No. 6,975,492, which is a continuation of application No. 10/090,662, filed on Mar. 4, 2002, now Pat. No. 6,657,834, which is a continuation of application No. 09/531,990, filed on Mar. 20, 2000, now Pat. No. 6,381,112, which is a continuation of application No. 09/138,955, filed on Aug. 24, 1998, now Pat. No. 6,040,967.--.

Signed and Sealed this

Fourteenth Day of August, 2007

JON W. DUDAS  
*Director of the United States Patent and Trademark Office*